United States Patent
Kolb et al.

Patent Number: 5,882,458
Date of Patent: Mar. 16, 1999

[54] TIRE BEAD FORMING METHOD AND APPARATUS

[75] Inventors: Robert W. Kolb, Clinton; Daniel Giovanoni, Rome, both of N.Y.

[73] Assignee: Bartell Machinery Systems, LLC, Rome, N.Y.

[21] Appl. No.: 899,547

[22] Filed: Jul. 24, 1997

[51] Int. Cl.⁶ .................................................. B29D 30/48
[52] U.S. Cl. ........................................... 156/136; 156/422
[58] Field of Search .................................... 156/136, 422; 245/1.5

[56] References Cited

U.S. PATENT DOCUMENTS

| | | | |
|---|---|---|---|
| 3,429,765 | 2/1969 | Mallory et al. | 156/422 |
| 4,496,411 | 1/1985 | Davies et al. | 156/136 |
| 5,228,942 | 7/1993 | Kokui et al. | 156/422 |
| 5,603,799 | 2/1997 | Kolb et al. | 156/422 |

*Primary Examiner*—Geoffrey L. Knable
*Attorney, Agent, or Firm*—George R. McGuire

[57] ABSTRACT

Th leading end of a tire bead wire is gripped in the usual manner radially inwardly of the inside diameter of the bead as a forming drum is rotated to form a hoop-like bead of multiple convolutions of the wire. Upon release by the gripper members, the leading, initially gripped end of the wire moves into a void provided therefor on the inner diameter of the bead. A member is then rotated to bring the outer surface of an arm into physical engagement with the end of the wire at the inner diameter of the bead, urging it into tight engagement with the tacky surfaces of adjacent wire convolutions, thereby ensuring that the inner wire end does not become disengaged. Certain elements may be mounted in either of two positions to effectively double their useful life. The stitching operation may be performed while the forming drum is still rotating, i.e., as the bead is being formed, whereby operation of the invention does not add to the time required to fabricate the beads.

21 Claims, 7 Drawing Sheets

TIRE BEAD FORMING METHOD AND APPARATUS

BACKGROUND OF THE INVENTION

The present invention relates to methods of and apparatus for winding tire bead wire on a forming machine and, more specifically, to the forming of tire beads, particularly single wire beads, in a manner which securely attaches end portion of the bead wire to adjacent convolutions at the inner diameter of the bead.

In the construction of vehicle tires it is the usual practice to incorporate a stiffening bead at both the inside and outside openings where the tire is to be mounted upon a rim. One common method of forming tire beads is to grip the leading end of a metal wire and wind multiple turns of the wire in a groove on a drum and to cut the wire, forming a trailing end of the wire on the wound bead and a leading end to be gripped for winding the next bead. The wire is coated with rubber or a similar, synthetic covering and, during the winding process is maintained at a temperature sufficient to render the coating tacky, whereby adjacent wires in the bead adhere to one another.

The leading end of the wire is mechanically gripped at a position radially inwardly of the side-by-side turns which form the inner diameter of the bead. U.S. Pat. No. 5,603,799, issued Feb. 18, 1997, assigned to applicants' assignee and incorporated herein by reference, discloses an insert for use in bead-winding drums to provide a void or open space on the inner diameter of the wound bead for accepting the leading end of the wire after it is released by the gripping means. The inner terminal end of the wire is biased by the natural set or tendency of the wire to straighten itself upon release and thus enters and occupies the open space when the bead is removed from the drum. However, no physical force is applied to ensure that the end portion of the wire adheres to adjacent wires in the bead and there remains the possibility that it may become dislodged.

The principal object of the present invention is to provide a method of and apparatus for forming tire beads wherein the leading, initially gripped end of the bead wire is securely adhered to adjacent wires before removal of the finished bead from the forming drum.

A further object is to provide apparatus for applying a physical force to the inner, terminal end of a tire bead wire to urge it into firmly adhering relation to adjacent convolutions in the bead upon completion of the winding operation.

Another object is to provide a tool for pressing a wire end portion into a space on the inner diameter of a tire bead wherein the tool is reversible to effectively double its useful life.

Other objects will in part be obvious and will in part appear hereinafter.

SUMMARY OF THE INVENTION

The present invention is incorporated in bead forming machinery which includes many prior art features. That is, the multi-section forming drum and axially movable shaft carrying the gripping jaws are conventional. Also, the insert of the previously mentioned patent is employed as before in the wire-receiving grooves of the drum. The leading end of each wire is inserted through an arcuate slot in the base of each groove in one of the drum sections to a position between the movable and stationary faces of the gripping jaws. The shaft carrying the movable jaw portions is then moved axially to grip the wire end and the entire forming drum is then rotated to wind successive convolutions of the wire to form a bead in each groove.

In the present invention, the movable jaw portions move between a pair of arms having outer surfaces which lie in a cylindrical plane concentrically surrounding the central shaft. The arms remain stationary as the shaft moves axially, carrying with it the movable jaw portions. After the drum has rotated a few revolutions, or after winding is completed, the gripped end of the wire may be released by opposite axial movement of the shaft and movable jaw portions. The shaft is then rotated 90°, carrying with it both the movable and stationary jaw portions and the aforementioned arms, the outer, cylindrical surface of one of which contacts the released end portion of the wire and pushes it firmly into place in the void provided therefor in the inner diameter of the bead. The end portion is firmly secured or "stitched" to the adjacent wires in the bead bundle. Although only one of the arms is used to physically contact and stitch the wire end portion, the shaft may be mounted in either of two diametrically opposite positions to permit use of the second arm after the first has become worn or damaged, thereby effectively doubling the life of the tool.

The foregoing and other features of structure and operation of the invention will be more readily understood and fully appreciated from the following detailed description, taken in conjunction with the accompanying drawings.

DETAILED DESCRIPTION

Figure 1:
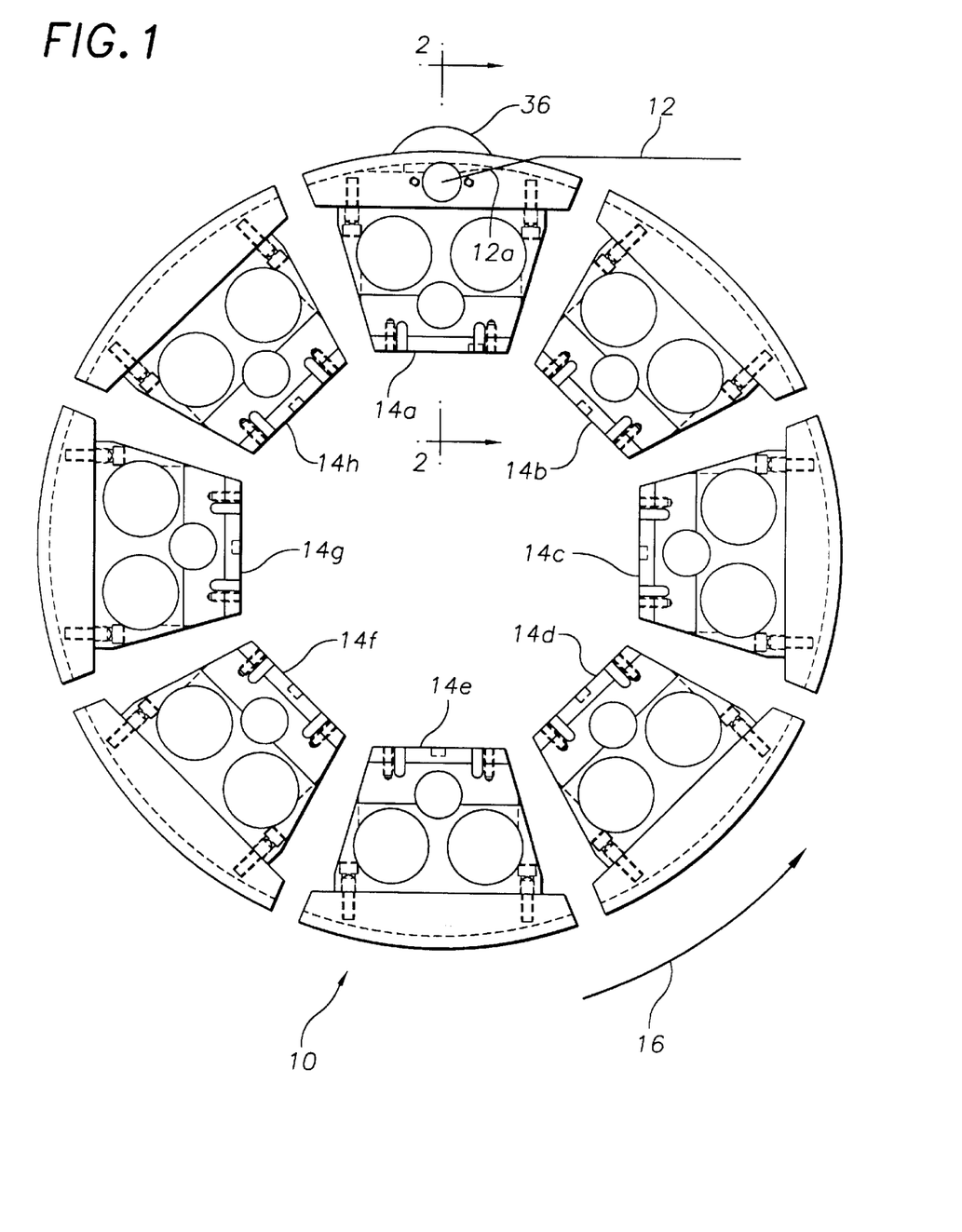
FIG. 1 is a simplified representation of a conventional, collapsible, rotatable tie bead former.

Referring now to the drawings, in FIG. 1 is shown a simplified representation of a winding or forming drum, denoted generally by reference numeral 10, for gripping leading end portion 12a of wire 12 taken from a supply roll (not shown) and winding multiple convolutions of the wire to form a tire bead. Drum 10 includes a plurality of generally trapezoidal shaped segments 14a–14h which are radially movable between the outer position shown, wherein the wire is wound by rotation of drum 10 in the direction indicated by arrow 16, and an inner position, wherein the finished bead is removed from the drum. Details of mounting, radial movement and rotation of the drum segments are entirely conventional and therefore not shown.

Figure 2:
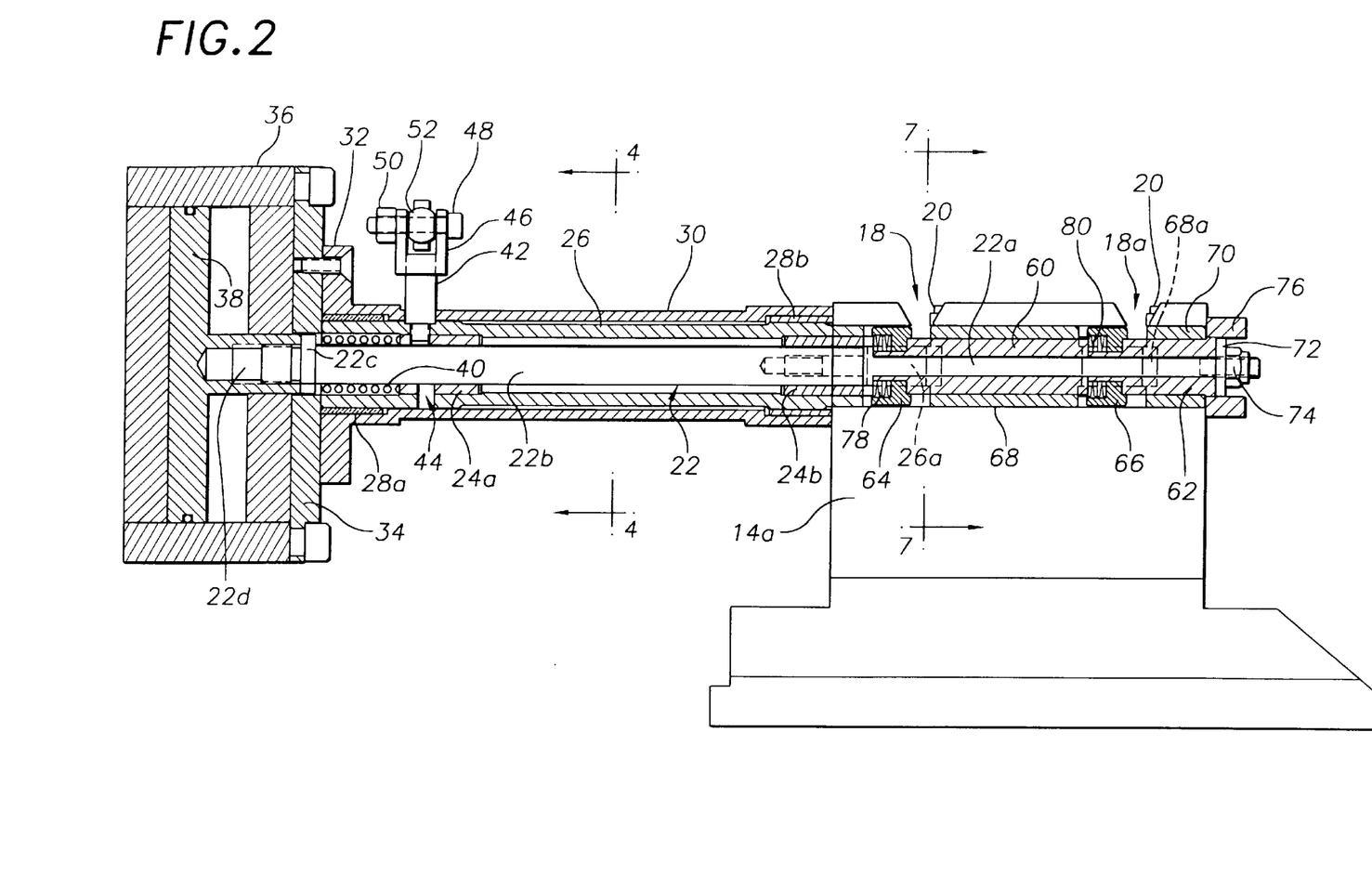
FIGS. 2 and 3 are elevational views in section on the line 2—2 of FIG. 1, showing certain parts in first and second, axially displaced positions, respectively.
Figure 3:
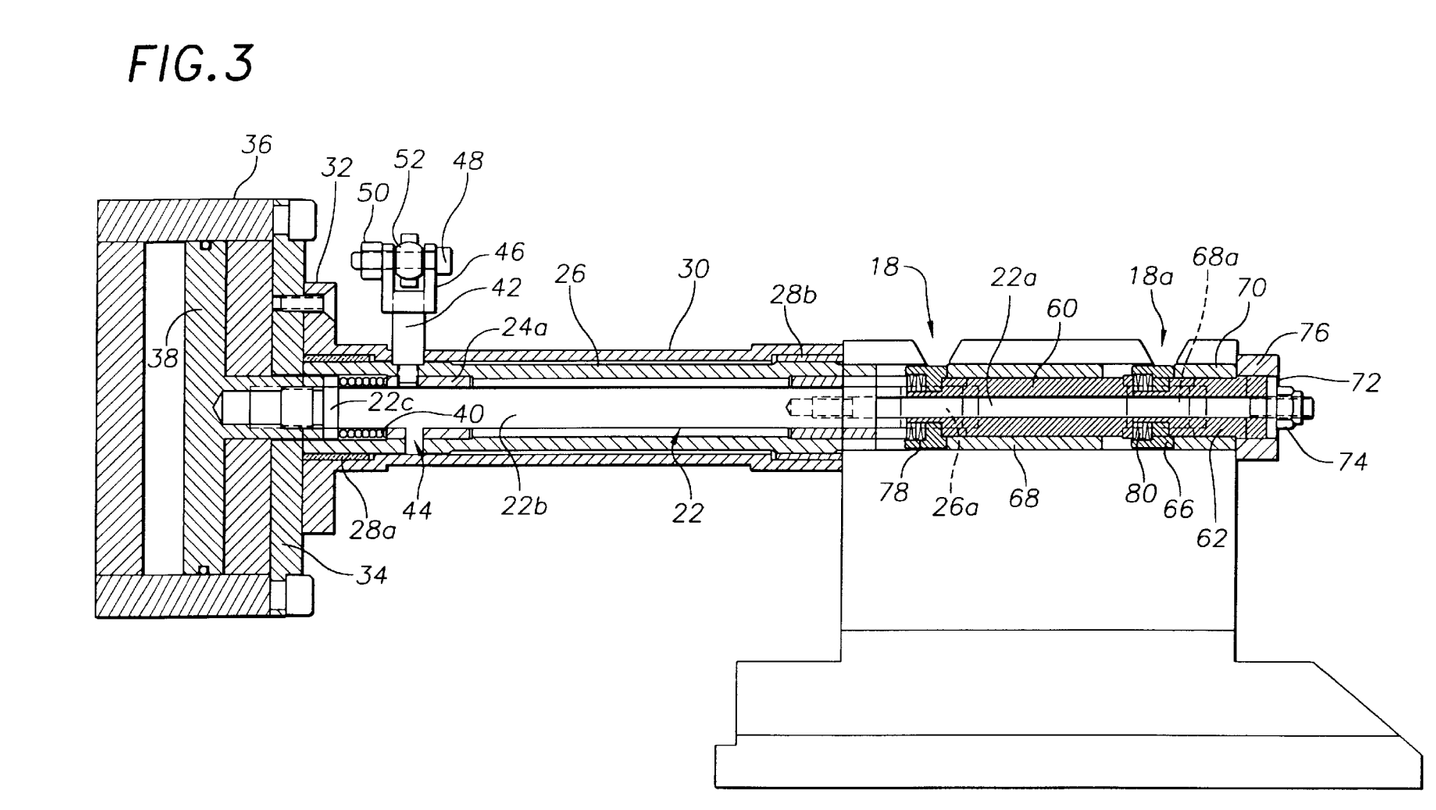

As seen in FIGS. 2 and 3, drum segment 14a has two bead-forming cavities or grooves 18, 18a, as do all the other segments, for simultaneously winding two separate wires 12. The number of grooves is optional and operation of the invention is the same regardless of the number of grooves provided in each drum segment. An arcuate opening or slot in the base of each of the grooves in drum segment 14a permits insertion of wire ends 12a into the interior of the segment where the gripping means are located. Also, it will be understood that an insert such as that disclosed in the previously referenced patent is provided in each of grooves 18, 18a, such inserts being indicated in FIGS. 2 and 3 by reference numeral 20.

The axially movable shaft which operates the gripper mechanism is denoted generally by reference number 22. For convenience, shaft 22 is formed in two sections which, for greater clarity, are not shown in section in FIGS. 2 and 3. Smaller diameter shaft section 22a is threaded into an opening in larger diameter section 22b, the latter having integrally formed head 22c and threaded end portion 22d. Shaft section 22b is mounted for sliding, axial movement in bushings 24a and 24b which are press-fitted in hollow sleeve 26. Sleeve 26 is mounted for sliding, rotary movement in bushings 28a and 28b which are press-fitted in opposite ends of housing 30.

Flange 32 on housing 30 is bolted to front plate 34 of pneumatic cylinder 36. End portion 22d of the central shaft is threadedly connected to piston 38 of cylinder 36, whereby the shaft in effect forms the cylinder operating rod. Pneumatic pressure applied to piston 38 through appropriate porting effects movement of the piston from the FIG. 2 to the FIG. 3 position, with accompanying axial movement of shaft 22 from left to right as viewed in these Figures. Upon release of pneumatic pressure, coil spring 40, acting upon head 22c of the shaft, returns the shaft and piston 38 to their FIG. 2 positions.

Figure 4:
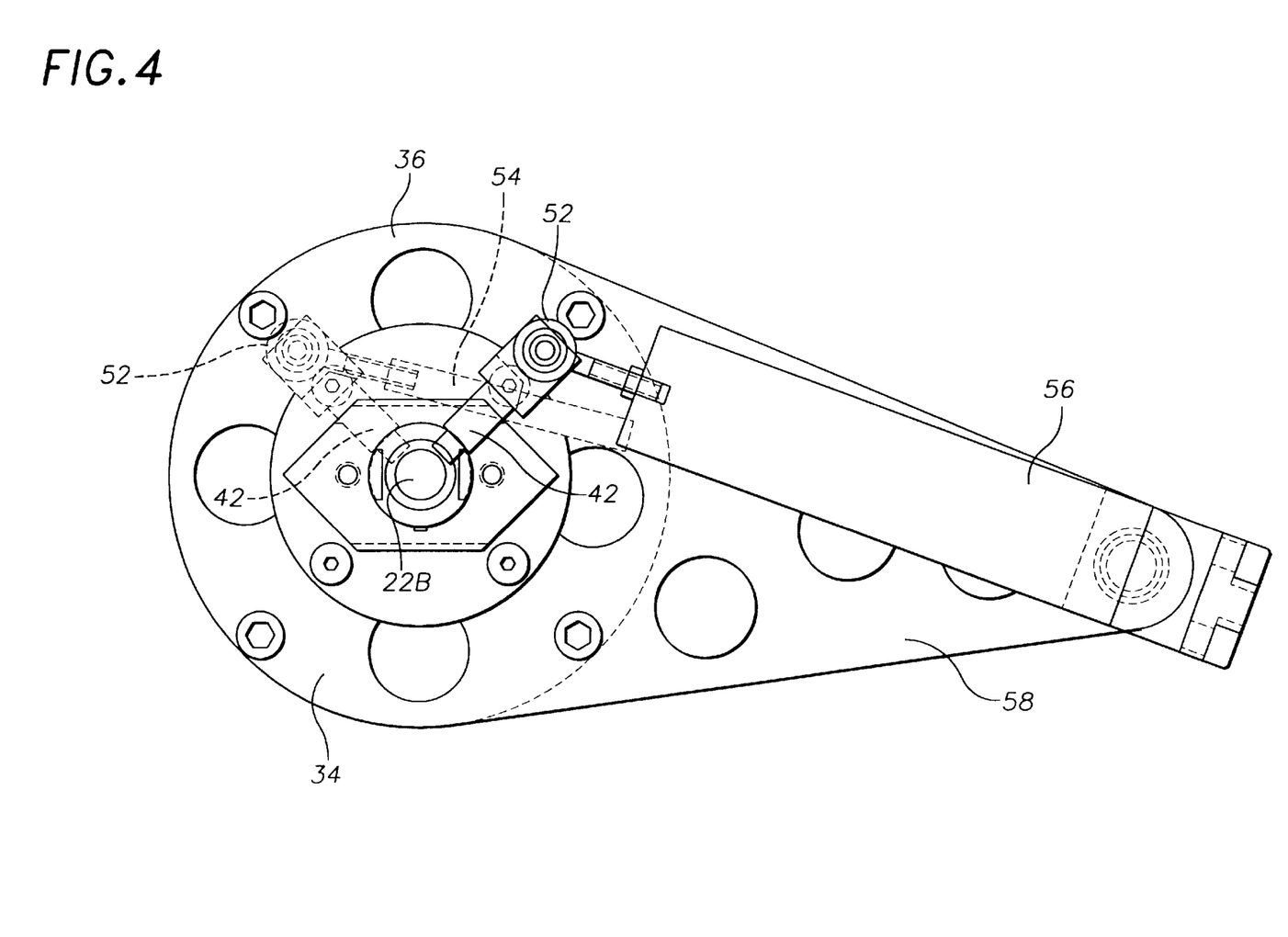
FIG. 4 is an elevational view in section on the line 4—4 of FIG. 2, with certain parts in both solid and dashed lines to show first and second, rotationally displaced positions, respectively.

The lower end of trunnion 42 passes through an arcuate opening in housing 30 and is threaded in aligned, tapped openings in sleeve 26 and bushing 24a. Diametrically opposite, aligned, tapped openings 44 are provided for purposes described later. Upper end 46 of trunnion 42 has a pair of spaced arms with aligned openings for passage of pin 48 which is secured by nut 50. Pin 48 also passes through an opening in end portion 52 which, as seen in FIG. 4, is affixed to operating rod 54 of double-acting, pneumatic cylinder 56. One end of cylinder 56 is pivotally connected to mounting bracket 58, extending integrally from front plate 34 of cylinder 36. Operation of cylinder 56 between opposite, terminal positions effects 90° rotation of trunnion 42 between the solid and dashed line positions of FIG. 4, thereby also rotating sleeve 26 and other elements, as explained later.

Referring again to FIGS. 2 and 3, the elements which are assembled upon shaft 22 include long and short spacer members 60 and 62, respectively, each having a through, axial bore with a diameter slightly larger than that of shaft section 22a. Movable gripper members 64 and 66 are mounted on smaller diameter portions of spacer members 60 and 62, respectively, and axially fixed gripper members 68 and 70 are mounted on the larger diameter portions of the spacer members. Washer 72 and nut 74 are installed on the terminal end of shaft portion 22a, and end cap 76 is secured to drum segment 14a. Two sets of spring washers 78 and 80 provide proper spacing and biasing forces on movable gripper members 64 and 66, respectively.

Figure 5:
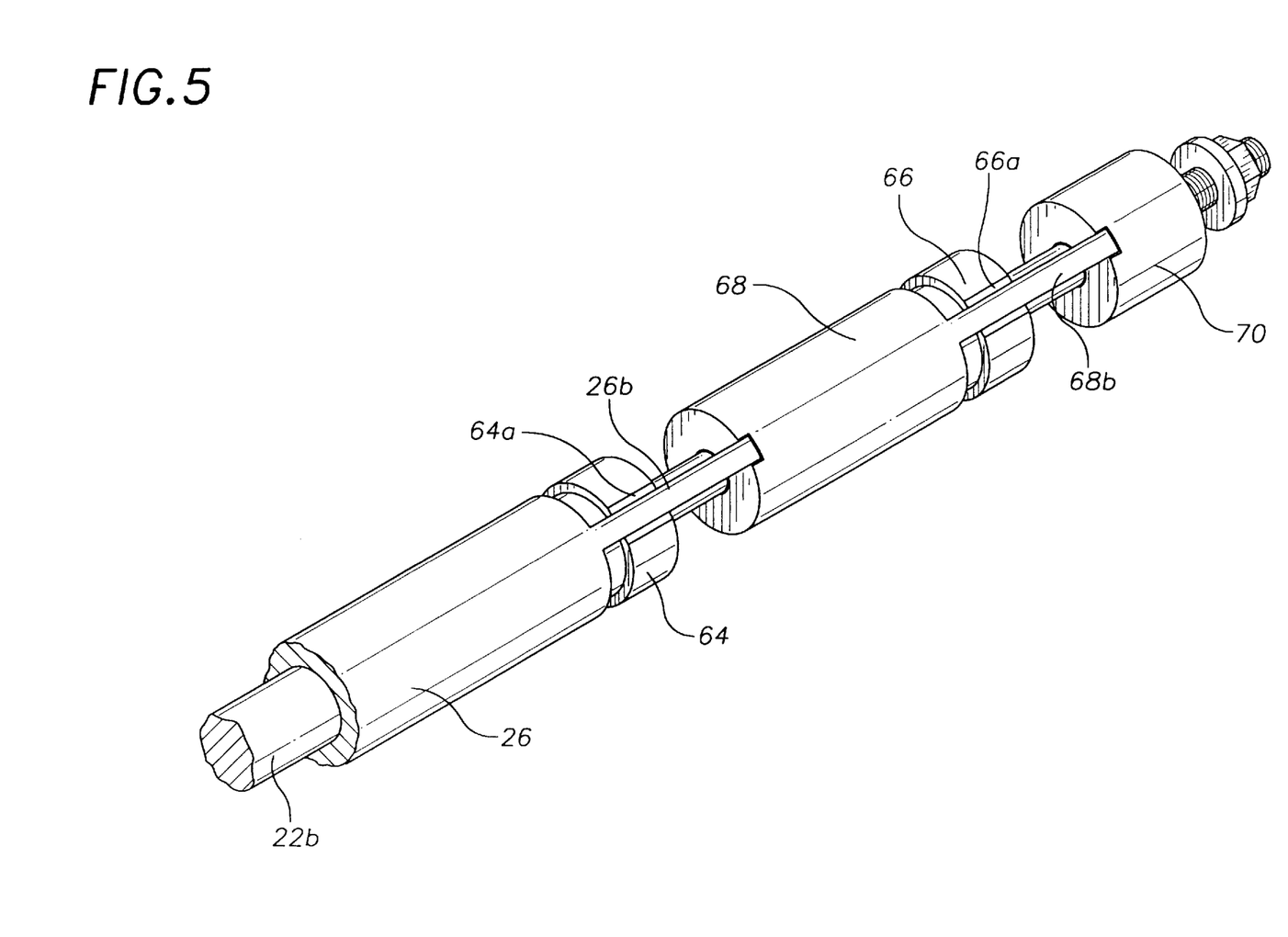
FIGS. 5 and 6 are assembled and exploded perspective views, respectively, of parts of the apparatus seen in FIGS. 2 and 3.
Figure 6:
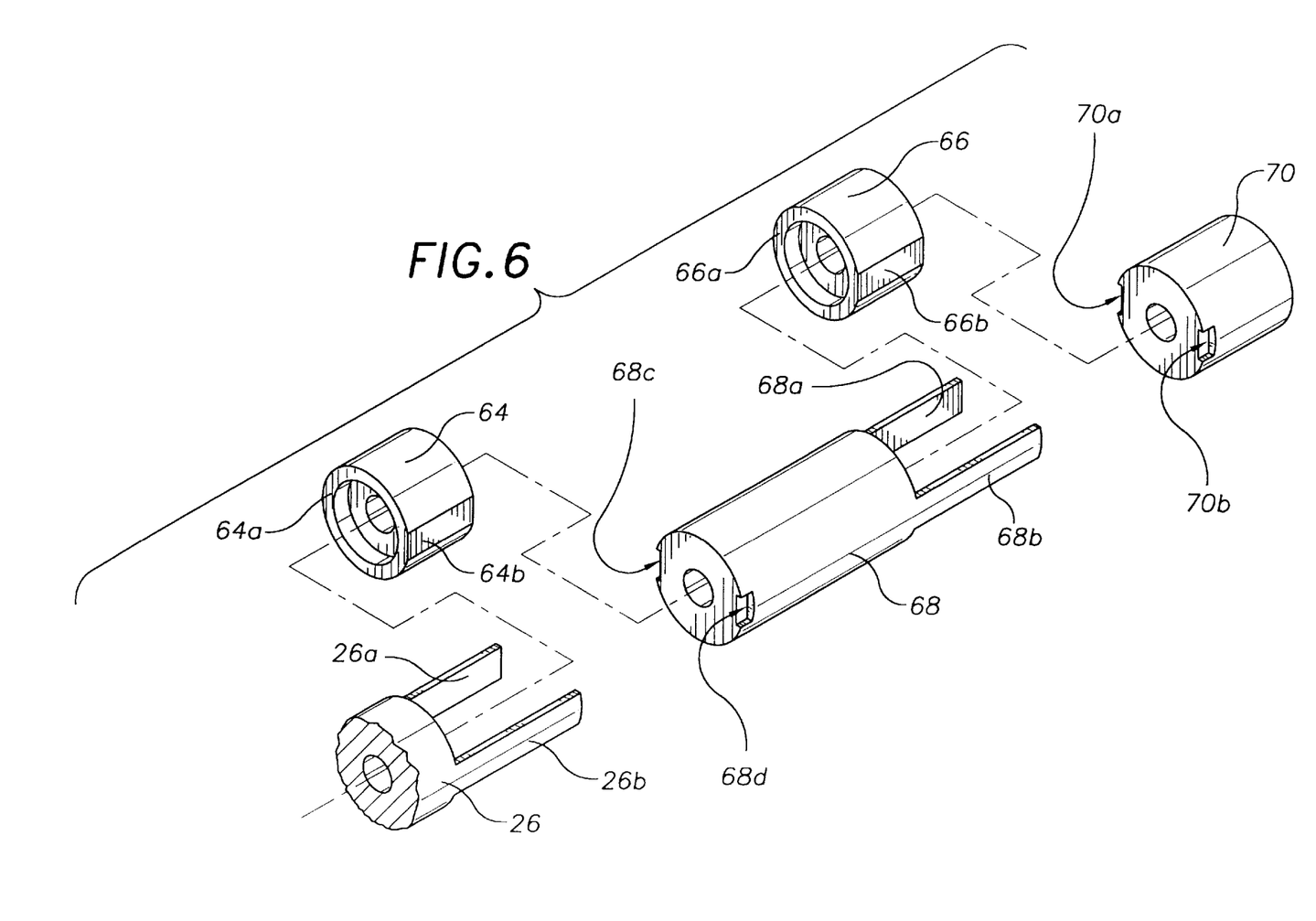

The movable and axially fixed gripper members, together with one end of sleeve 26, are seen in perspective view in FIGS. 5 and 6, providing a more detailed showing of their structural features and cooperative relationship. For greater clarity, spacer members 60 and 62 are not shown in these views. A pair of arms 26a and 26b extend to free, terminal ends on opposite sides of sleeve 26. Likewise, arms 68a and 68b extend from opposite sides of axially fixed gripper member 68. The terminal ends of arms 26a and 26b are received in slots 68c and 68d in member 68; the terminal ends of arms 68a and 68b are received in slots 70a and 70b of member 70. The inner, opposing surfaces of arms 26a and 26b, and of arms 68a and 68b are flat, whereas the outer surfaces lie in the common, cylindrical plane of the outer surfaces of sleeve 26 and members 68 and 70. The outer surfaces of gripper members 64 and 66 also lie in this cylindrical plane except on opposite sides which are flat. Opposite, flat sides 64a and 64b of member 64, and sides 66a and 66b of member 66 are shown in FIG. 6.

Arms 26a and 26b extend along opposite sides of movable gripper member 64 with the inner, flat surfaces of the arms in close proximity to the flat surfaces of the gripper member. Likewise, the flat sides of gripper member 66 lie between arms 68a and 68b and oppose the flat surfaces thereof. With the elements in the position of FIG. 2, portion 12a of a bead wire 12 is placed between the opposing surfaces of movable and fixed gripper members 64 and 68; the end portion of a second wire is placed between the opposing surfaces of movable and fixed gripper members 66 and 70. Cylinder 36 is then actuated, moving the elements to the position of FIG. 3, thereby gripping the wire ends between the two sets of gripper members.

In moving from the FIG. 2 to the FIG. 3 position, shaft 22 moves from left to right as seen in these Figures, sliding axially through bearings 24a and 24b. Larger diameter shaft section 22b moves spring washers 78, thereby effecting axial movement of gripper member 64, spacer 60, gripper member 66 and spacer 62. Washer 72 and nut 74, of course, also move from left to right. End cap 76 prevents axial movement of gripper member 70, which prevents axial movement of gripper member 68. Spring 40 is compressed between shaft head portion 22c and axially fixed bearing 24a.

With wire ends 12a firmly gripped between opposing surfaces of movable gripper members 64, 66 and axially fixed gripper members 68, 70, drum 10 is rotated to wind the wires in grooves 18, 18a to form the beads in the usual manner with inserts 20 providing a space to accept end portions 12a within the inner diameters of the beads. Pneumatic pressure on piston 38 is removed when winding is completed or, preferably, after several layers of the bead have been wound, whereupon spring 40 returns piston 38 to the position of FIG. 2. Shaft 22 and spacers 60 and 62, as well as movable gripper members 64 and 66, likewise move back to their positions of FIG. 2. Upon release of wire end portions 12a, either before or after winding is complete, cylinder 56 is actuated, moving trunnion 42 and related elements from the solid to the dashed line positions of FIG. 4. This movement rotates sleeve 26 through an angle of 90°. Arms 26a and 26b of sleeve 26 thus rotate from the FIG. 7 to the FIG. 8 position. Arm 26a contacts wire end portion 12a, exerting a physical force urging the free end of the bead wire into tight contact with adjacent convolutions at the inner diameter of the bead. Engagement of the terminal ends of arms 26a and 26b of sleeve 26 with slots 68c and 68d, respectively, of member 68 causes rotation of arm 68a into contact with wire end portion 12a in groove 18a.

Figure 7:
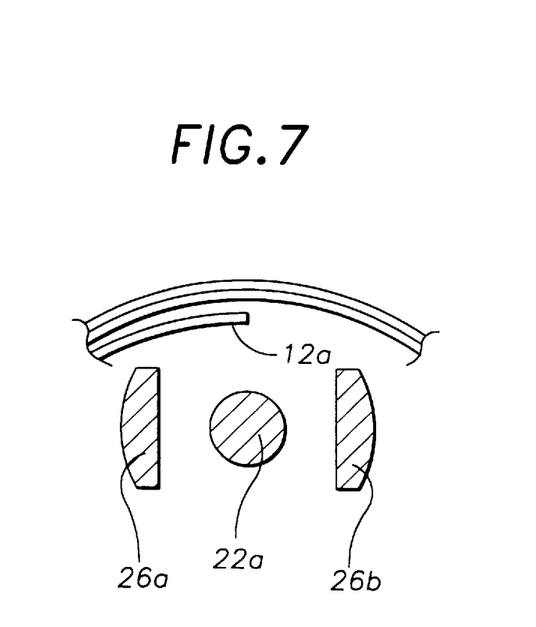
FIGS. 7 and 8 are somewhat diagrammatic, fragmentary, elevational views generally in section on the line 7—7 of FIG. 2, illustrating the manner of operation of the invention with respect to convolutions of wire forming a tire bead.
Figure 8:
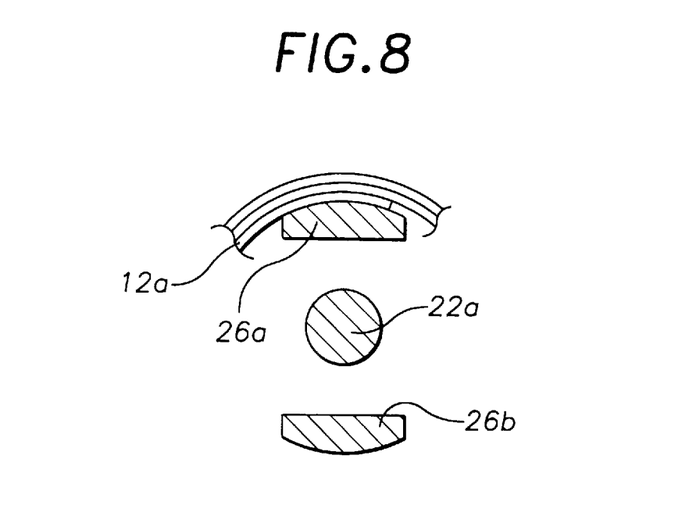

Opposite actuation of cylinder 56 counter-rotates the elements to the FIG. 7 position. Movable gripper members 64 and 66 are also reciprocally rotated, due to the close proximity of the flat surfaces on arms 26a dn 26b with the flat sides of member 64, and the like surfaces on arms 68a, 68b and member 66. However, members 64 and 66 have no effect on the stitching operation. Shaft 22 does not rotate. When rotation of drum 10 is stopped and segments 14a–14h are moved radially inwardly the finished beads are removed from the drum with the end of the bead wire at the inner diameter securely stitched to adjacent wire convolutions.

An additional feature of the invention is the reversible mounting of sleeve 26 and associated elements to double the life of the gripping-stitching tool. During reciprocating rotation between the positions of FIGS. 7 and 8, only arms 26a and 68a contact the bead wires. After repeated contacts, the outer surfaces of the arms become scored and worn. When this occurs, trunnion 42 is removed from the threaded opening in sleeve 26 in which it is shown in FIGS. 2 and 3, the sleeve is rotated 180°, together with the other elements carried on shaft 22. Trunnion 42 is threaded into previously mentioned tapped opening 44 in sleeve 26 and bearing 24a. Reciprocating rotation of sleeve 26 then brings arms 26b and 68b into contact with the end portion of the bead wire and the tool may be used until the surfaces of these arms requires replacement of at least sleeve 26 and member 68.

What is claimed is:

1. Tire bead forming apparatus comprising:
   a) a rotatable bead former having at least one forming cavity for receiving a plurality of convolutions of the tire bead wire;
   b) gripping means movable between gripping and released positions with respect to the inner termination end of said wire at a position radially inwardly of said cavity;
   c) means for forming a void in the inside surface of a tire bead formed in said cavity, said void being positioned radially adjacent said inner termination end to receive the latter upon release thereof by said gripping means; and
   d) means movable to physically engage said inner termination end and urge it into tight engagement with adjacent convolutions of said wire.

2. The forming apparatus of claim 1 wherein said movable means comprises a rigid member rotatable between engaging and spaced positions with respect to said inner termination end.

3. The forming apparatus of claim 1 wherein said gripping means includes an axially fixed and an axially movable gripping member.

4. The forming apparatus of claim 3 and further including an elongated shaft mounted for reciprocal axial movement, said axially movable gripping member being movable with said shaft.

5. The forming apparatus of claim 4 wherein both said axially fixed and movable gripping members are jointly rotatable about said shaft.

6. The forming apparatus of claim 3 wherein said movable means is an integral part of said axially fixed gripping member.

7. The forming apparatus of claim 6 wherein said movable means comprises an arm extending generally axially of said axially fixed gripping member.

8. The forming apparatus of claim 4 wherein said movable means comprises an arm extending generally parallel to said shaft and spaced radially outwardly thereof.

9. The forming apparatus of claim 8 and further including means for rotating said arm about the axis of said shaft between engaging and spaced positions with respect to said inner termination end.

10. The forming apparatus of claim 9 wherein said rotating means comprise means for reciprocally rotating said arm through an angle of 90° in moving between said engaging and spaced positions.

11. The forming apparatus of claim 10 wherein said arm comprises a first arm, and further including a second arm and a hollow sleeve coaxial with said shaft, said first and second arms extending axially from one end of said sleeve on diametrically opposite sides thereof.

12. The forming apparatus of claim 11 and further including means for selectively mounting said sleeve in either of first and second, 180° opposite positions about its central axis, whereby said first arm is rotated to and from said engaging position when said sleeve is mounted in said first position, and said second arm is rotated to and from said engaging position when said sleeve is mounted in said second position.

13. In tire bead forming apparatus having a drum rotatable about a first axis to wind a plurality of convolutions of a tire bead wire in a forming cavity of said drum to provide a tire bead, said apparatus further having gripping means movable between gripping and released positions with respect to the inner termination end of said wire, said termination end being movable upon at least partial winding of said bead and movement of said gripping means to said released position into the inner diameter of said bead, the improvement comprising:
   a) a member having a surface movable between a first position, spaced from said bead inner diameter, and a second position, tangent to said bead inner diameter at a position wherein said surface contacts said termination end to urge the latter into binding relation with adjacent convolutions of said wire; and
   b) means for effecting movement of said member between said first and second positions of said surface.

14. The improvement of claim 13 wherein said member is axially stationary.

15. The improvement of claim 14 wherein said member is mounted for rotation about a second axis, parallel to said first axis, and said means for effecting movement comprises means for rotating said member.

16. The improvement of claim 15 and further including a shaft having a second axis, parallel to said first axis, and means for mounting said member upon said shaft, said means for reciprocally rotating comprising means for reciprocally rotating said shaft about said second axis.

17. The improvement of claim 16 wherein said member comprises an arm extending generally axially of said shaft and spaced radially outwardly thereof.

18. The improvement of claim 16 wherein said gripping means includes a first gripping element axially movable with said shaft and a seconds axially fixedly gripping element, and further comprising means for effecting reciprocal, axial movement of said shaft to move said gripping means between said gripping and released positions, said member being axially fixed.

19. The method of forming a tire bead comprising multiple convolutions of a bead wire having a tacky coating for adherence to adjacent convolutions, said method comprising:
   a) gripping a leading, terminal end portion of said wire at a position radially inwardly of a forming cavity in a bead forming drum;
   b) rotating said drum to wind multiple convolutions of said wire in said cavity;
   c) releasing said terminal end;
   d) moving a rigid member into contact with said terminal end, applying thereto a physical force urging the tacky surface thereof into secure engagement with adjacent convolutions of said wire at the inner diameter of said bead; and
   e) removing the finished bead from said drum.

20. The method of claim 19 wherein said rigid member is moved rotationally to contact said terminal end.

21. The method of claim 19 wherein said terminal end is released and contacted by said rigid member during rotation of said drum.

* * * * *